United States Patent
Hsieh

(10) Patent No.: US 7,312,719 B2
(45) Date of Patent: Dec. 25, 2007

(54) SYSTEM AND METHOD FOR DIAGNOSING BREAKDOWNS OF A SWITCH BY USING PLURAL LEDS

(75) Inventor: Tsvng-Yin Hsieh, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 487 days.

(21) Appl. No.: 11/074,994

(22) Filed: Mar. 8, 2005

(65) Prior Publication Data
US 2005/0206528 A1   Sep. 22, 2005

(30) Foreign Application Priority Data
Mar. 19, 2004   (TW) ............... 93107400 A

(51) Int. Cl.
G08B 5/22   (2006.01)
(52) U.S. Cl. .................... 340/815.45; 340/644; 362/30
(58) Field of Classification Search ........... 340/815.45, 340/644, 525, 691.6, 332, 815.4, 286.02; 362/30, 612; 709/224
See application file for complete search history.

(56) References Cited

U.S. PATENT DOCUMENTS 5,369,392 A * 11/1994 Hoffman et al. ............ 340/438
6,169,491 B1 * 1/2001 McDonald ............... 340/815.4
6,627,829 B2   9/2003 Sato ............................ 200/310
2004/0199627 A1 * 10/2004 Frietsch ....................... 709/224
2005/0088979 A1 * 4/2005 Mehra ......................... 370/254

FOREIGN PATENT DOCUMENTS

CN   0012374.1   9/2000

* cited by examiner

Primary Examiner—Phung T. Nguyen
(74) Attorney, Agent, or Firm—Morris Manning Martin LLP; Tim Tingkang Xia, Esq.

(57) ABSTRACT

A system for diagnosing breakdowns of a switch by using plural light emitting diodes (LEDs) on a front panel (10) of the switch includes: plural port LEDs (31, 32, 33, 34, ... 3n), a user interface (50) for generating an instruction to convert display modes of the port LEDs, a CPU (central processing unit) (60) coupled to the user interface for dealing with the instruction, an LED driver (70) coupled to the port LEDs for refreshing the displays of the port LEDs; a physics (PHY) module (80) coupled to the LED driver and used for obtaining the operation statuses of the ports; and a periodic service manager (90) coupled to the LED driver for triggering the LED driver periodically. Display modes of the port LEDs can be converted selectively, which reduces the number of port LEDs needed, and still allows administrators to conveniently diagnose any breakdowns of the switch.

20 Claims, 6 Drawing Sheets

SYSTEM AND METHOD FOR DIAGNOSING BREAKDOWNS OF A SWITCH BY USING PLURAL LEDS

BACKGROUND OF THE INVENTION

1. Field of the Invention

The present invention relates to systems and methods for diagnosing breakdowns of a switch typically used in a communications network, and more particularly to a system and method for diagnosing breakdowns of a switch by observing displays of a plurality of light emitting diodes (LEDs) on a front panel of the switch.

2. Prior Art

When a communications network breaks down, an administrator of the network usually determines whether a power supply and ports of a network device are in working order by observing displays of LEDs on a front panel of the network device. Subsequently, the administrator may check the internal hardware or software of the network device. At present, a switch can display the operation statuses of a power supply, a redundant power supply (RPS), and a plurality of ports by using plural LEDs dynamically. However, there are generally several switches that have a great deal of ports. Accordingly, a great many port LEDs are needed for denoting various working statuses of all the ports. In addition, each port generally has three basic operational characteristics: a link/activity status, a speed status, and a full/half duplex status. Therefore, each port needs at least three port LEDs to display the three operational characteristics. If the total number of port LEDs is too great, it is difficult to readily observe the display of each port LED.

Therefore, a new, simplified system and method for diagnosing breakdowns of a switch by using plural LEDs are needed.

SUMMARY OF THE INVENTION

Accordingly, an objective of the present invention is to provide a system for diagnosing breakdowns of a switch by using plural LEDs, in which display modes of port LEDs can be selectively converted in order to display different operational characteristics of ports.

Another objective of the present invention is to provide a method for diagnosing breakdowns of a switch by using plural LEDs, in which display modes of port LEDs can be selectively converted in order to display different operational characteristics of ports.

In order to accomplish the above-mentioned objectives, in the present invention, each port only needs one port LED that has three display modes for displaying three different operational characteristics of the port. The three display modes of the port LEDs can be converted at any time at a user interface.

In order to accomplish the above-mentioned first objective, a preferred system for diagnosing breakdowns of a switch comprises: a plurality of port light emitting diodes (LEDs) for displaying operation statuses of a plurality of ports; a user interface for generating an instruction to convert display modes of the port LEDs; a CPU (central processing unit) coupled to the user interface for dealing with the instruction and obtaining operation statuses of a power supply and a redundant power supply (RPS); an LED driver coupled to the port LEDs for refreshing the displays of the port LEDs; a physics (PHY) module coupled to the LED driver and used for obtaining the operation statuses of the ports; and a periodic service manager coupled to the LED driver for triggering the LED driver to refresh the port LEDs periodically.

In order to accomplish the above-mentioned second objective, a method for diagnosing breakdowns of a switch comprises the following steps: (a) setting a refresh time interval; (b) triggering an LED driver; (c) obtaining operation statuses of a power supply and a redundant power supply (RPS); (d) obtaining operation statuses of a plurality of ports; (e) refreshing displays of a plurality of LEDs; (f) determining whether a refresh time interval has elapsed, and if so, returning to step (b); otherwise, (g) determining whether a display mode of the port LEDs has been converted, and if so, returning to step (a).

Because the display modes of the port LEDs can be selectively converted at any time, an administrator can readily observe the display of each port LED and conveniently diagnose any breakdown of the switch.

DETAILED DESCRIPTION OF THE INVENTION

Figure 1:
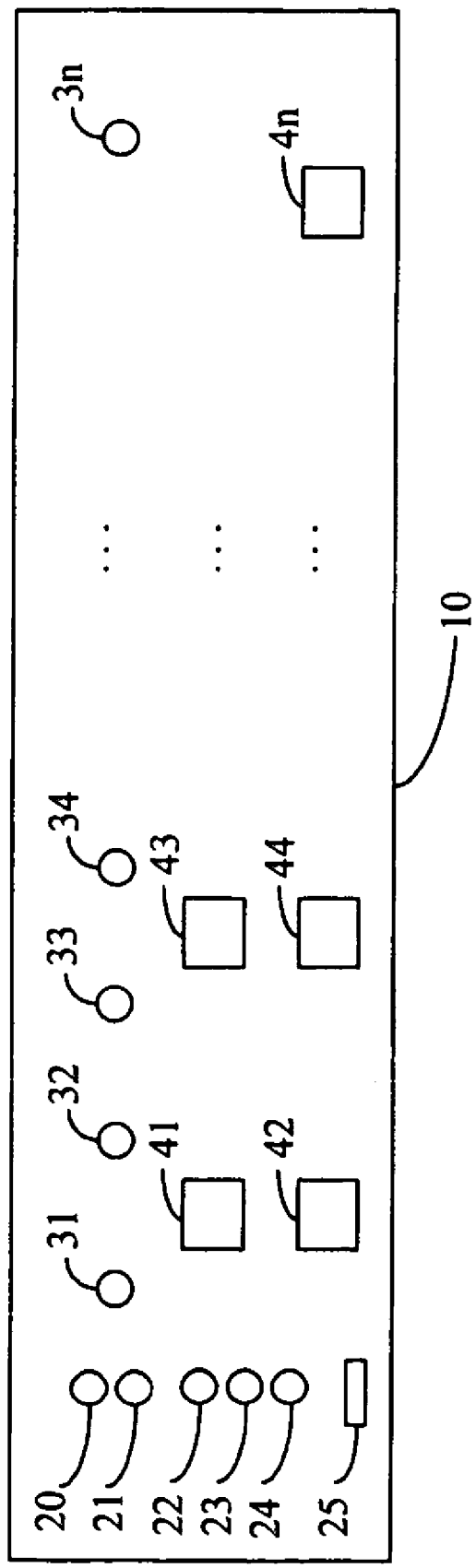
FIG. 1 is a schematic diagram of a front panel of a switch in accordance with a preferred embodiment of the present invention.

FIG. 1 shows a front panel 10 of a switch device according to the present invention. The front panel 10 has a power light emitting diode (LED) 20, a redundant power supply (RPS) LED 21, a link/activity LED 22, a speed LED 23, a full/half duplex LED 24, a mode convert button 25, a plurality of port LEDs 31, 32, 33, 34, . . . 3n, and a plurality of connection ports 41, 42, 43, 44, . . . 4n arrayed thereon. The link/activity LED 22, the speed LED 23 and the full/half duplex LED 24 are all called mode LEDs in the present invention. The power LED 20, the RPS LED 21, and the port LEDs 31, 32, 33, 34, . . . 3n are bi-colored LEDs. The mode LEDs 22, 23, 24 are single-colored LEDS. Display modes of the port LEDs 31, 32, 33, 34, . . . 3n are converted by pressing the mode convert button 25. When an administrator presses the mode convert button 25, a corresponding one of the link/activity LED 22, speed LED 23 and full/half duplex LED 24 displays a green light. In the following description, unless otherwise indicated, "display" means to continuously display a particular color. The administrator can know working statuses of the switch, and diagnose simple breakdowns, by observing the displays of the power LED 20, the RPS LED 21, the link/activity LED 22, the speed LED 23, the full/half duplex LED 24, and the port LEDs 31, 32, 33, 34, . . . 3n. Table 1 and table 2 list one or more color statuses of each LED, and corresponding operation statuses of the switch. Table 2 includes information on the color statuses of the port LED 31 only, and the corresponding operation statuses of the port 41 only. This is because the other port LEDs 32, 33, 34, . . . 3n and corresponding ports 42, 43, 44, . . . 4n have the same color and operation status characteristics as those of the port LED 31 and corresponding port 41. For the sake of brevity, the other port LEDs 32, 33, 34, . . . 3n and corresponding ports 42, 43, 44, . . . 4n are not fully described in detail herein.

TABLE 1

| LED | Color Status | Operation Status |
|---|---|---|
| Power LED 20 | Green | A power supply is valid. |
|  | Off | The power supply is invalid. |
| RPS LED 21 | Green | When the power supply is invalid, an RPS is connected to the switch, and the RPS works normally. |
|  | Amber | When the power supply is invalid, the RPS is connected to the switch, but the RPS cannot work normally. |
|  | Off | Either the power supply is valid; or the power supply is invalid, and the RPS is not connected to the switch. |

TABLE 2

| Mode LEDs 22, 23, 24 | Color Status of Port LED 31 | Operation Status of Port 41 |
|---|---|---|
| The link/activity LED 22 is on, and the speed LED 23 and the full/hall duplex LED 24 are off. | Off | The port 41 is not connected to the switch. |
|  | Green | The port 41 is connected to the switch. |
|  | Amber | The port 41 is connected to the switch, but cannot send or receive data normally. |
|  | Flashing Green | The port 41 is connected to the switch, and sends or receives data normally. |
| The speed LED 23 is on, and the link/activity LED 22 and full/hall duplex LED 24 are off. | Off | Data are transmitted through the port 41 at a speed of 10 Mbps. |
|  | Green | Data are transmitted through the port 41 at a speed of 100 Mbps. |
|  | Flashing Green | Data are transmitted through the port 41 at a speed of 1000 Mbps. |
| The full/hall duplex LED 24 is on, and the link/activity LED 22 and the speed LED 23 are off. | Off | Data are transmitted through the port 41 in a half duplex mode. |
|  | Green | Data are transmitted through the port 41 in a full duplex mode. |

When the switch works correctly, the power LED 20 and the RPS LED 21 are not lit up at the same time. This is because when the power supply is invalid, the RPS can provide power for the switch to prevent loss of network traffic. In addition, only one LED among the link/activity LED 23, speed LED 24 and the full/half duplex LED 25 is lit up at any special moment.

Figure 2:
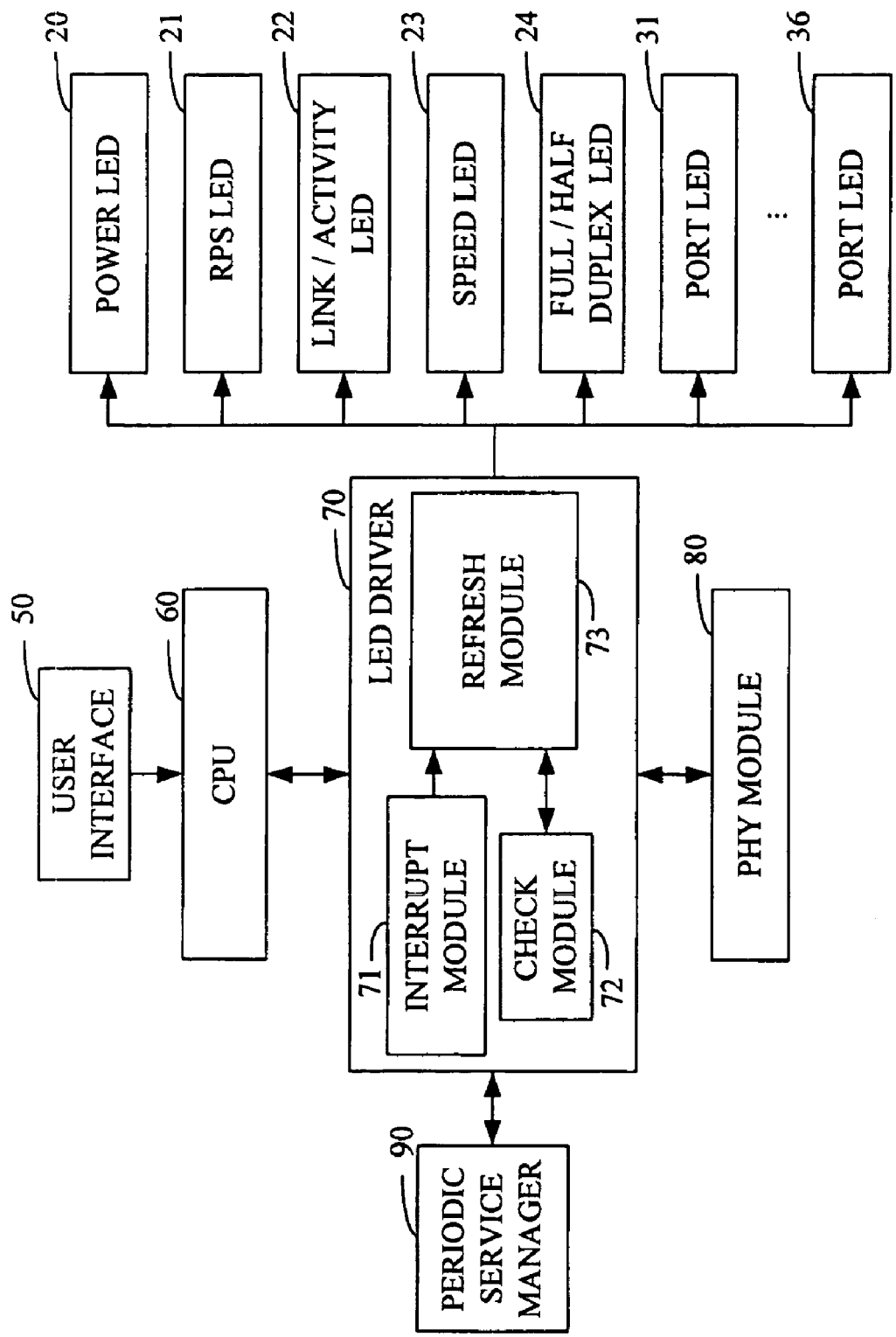
FIG. 2 is a block diagram of a system for diagnosing breakdowns of the switch by using plural LEDs.

FIG. 2 shows a system for diagnosing breakdowns of the switch by observing displays of the plural LEDs 20, 21, 22, 23, 24, 31, 32, 33, 34, . . . 3n (hereinafter, "the plural LEDs"). The system comprises the power LED 20, the RPS LED 21, the link/activity LED 22, the speed LED 23, the full/half duplex LED 24, the plurality of port LEDs 31, 32, 33, 34, . . . 3n, a user interface 50, a CPU 60, an LED driver 70, a physics (PHY) module 80, and a periodic service manager 90. In the present embodiment, the user interface 50 is used for generating an instruction for converting a current display mode of each port LED 31, 32, 33, 34, . . . 3n. The CPU 60 is coupled to the user interface 50 for dealing with the instruction that is generated via the user interface 50, and obtaining operation statuses of the power supply and the RPS. In the present embodiment, the user interface 50 comprises the mode convert button 25. The LED driver 70 is connected to the CPU 60, the power LED 20, the RPS LED 21, the link/activity LED 22, the speed LED 23, the full/half duplex LED 24 and the plurality of port LEDs 31, 32, 33, 34, . . . 3n. The LED driver 70 drives all of the plural LEDs to display different color statuses according to the current operation status of the power supply, the RPS and the ports 41, 42, 43, 44, . . . 4n. The PHY module 80 is coupled to the LED driver 70, and is used for obtaining the operating status of each port 41, 42, 43, 44, . . . 4n dynamically. The periodic service manager 90 is connected to the LED driver 70, for triggering the LED driver 70 to refresh the displays of the plural LEDs periodically.

In the present embodiment, the LED driver 70 comprises an interrupt module 71, a check module 72, and a refresh module 73. When the CPU 60 receives the instruction for converting the current display mode of the port LEDs 31, 32, 33, 34, . . . 3n, the CPU 60 drives the interrupt module 71 to restart the LED driver 70. In addition, the interrupt module 71 resets the periodic service manager 90. Subsequently, the periodic service manager 90 resets a refresh time interval, and begins a next cycle. The check module 72 is used for obtaining current operation statuses of the power supply and the RPS from the CPU 60, and obtaining current operation statuses of the ports 41, 42, 43, 44, . . . 4n corresponding to the current display mode from the PHY module 80. For example, when the full/hall duplex LED 24 is lit up by pressing the mode convert button 25, the PHY module 80 obtains the full/half duplex statuses of the ports 41, 42, 43, 44, . . . 4n, and the port LEDs 31, 32, 33, 34 . . . 3n display the full/half duplex statuses of the ports 41, 42, 43, 44, . . . 4n. The refresh module 73 is connected to the interrupt module 71 and the check module 72. The refresh module 73 refreshes the power LED 20, the RPS LED 21 and the port LED 22 to display corresponding color statuses based on the operation statuses of the power supply, the RPS and the ports 41, 42, 43, 44, . . . 4n that are provided by the check module 72. In addition, displays of the link/activity LED 22, the speed LED 23 and the full/half duplex LED 24 are refreshed by the refresh module 73 after the interrupt module 71 restarts the LED driver 70.

Figure 3:
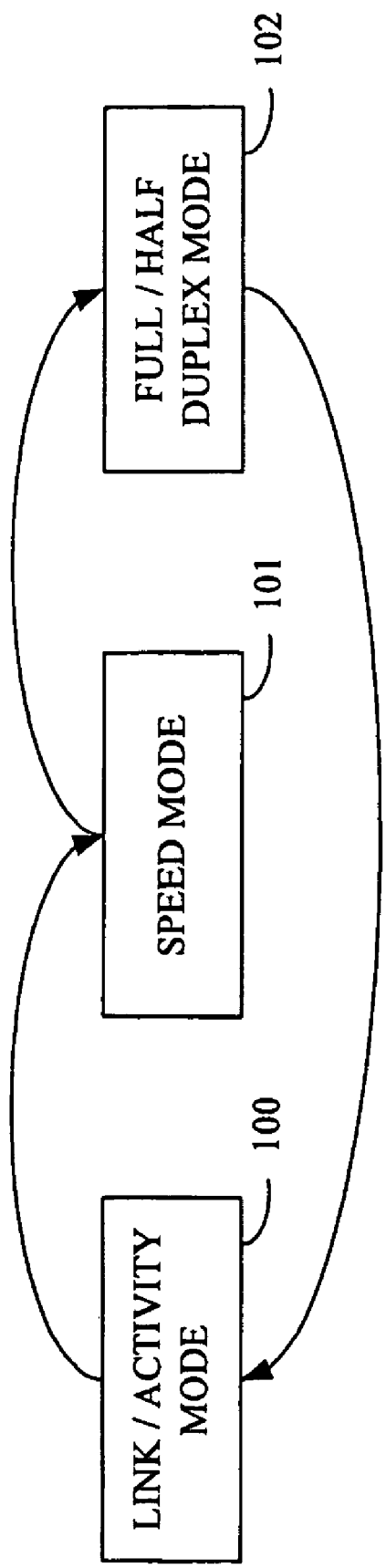
FIG. 3 is a schematic diagram of a conversion sequence of display modes of port LEDs of the switch.

FIG. 3 shows a conversion sequence of the display modes of the port LEDs 31, 32, 33, 34, . . . 3n. The port LEDs 31, 32, 33, 34, . . . 3n have three kinds of display modes: a link/activity mode 100, a speed mode 101, and a full/half duplex mode 102. The display mode of the port LEDs 31, 32, 33, 34, . . . 3n is converted in turn by pressing the mode convert button 25. For instance, if the current display mode of the port LEDs 31, 32, 33, 34, . . . 3n is the link/activity mode 100, the display mode can be converted into the speed mode 101 by pressing the mode convert button 25 once.

Figure 4:
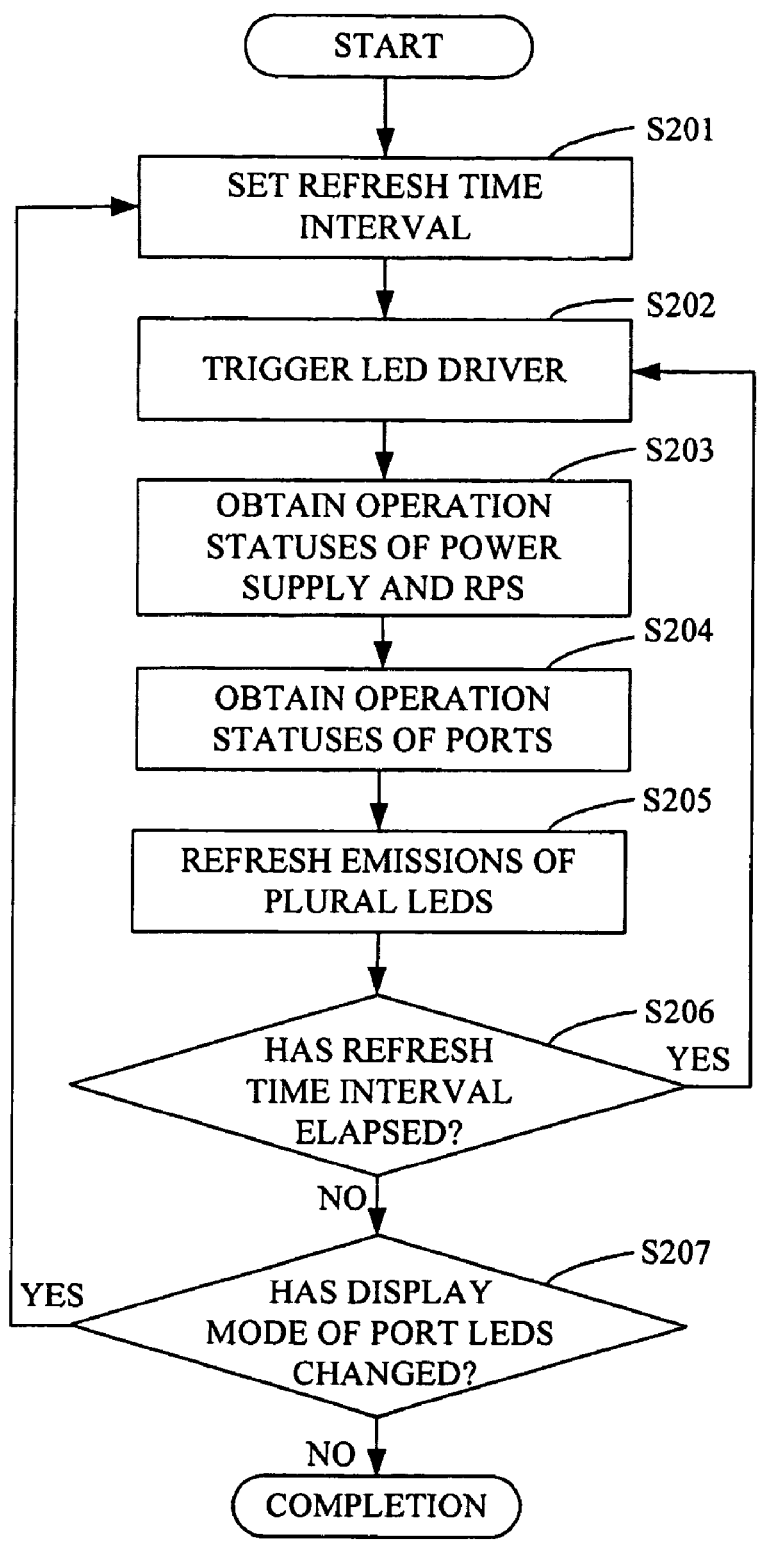
FIG. 4 is a flow chart of a method for diagnosing breakdowns of the switch by using the plural LEDs.

FIG. 4 shows a method for diagnosing breakdowns of the switch by using the plural LEDs. At step S201, the periodic service manager 90 sets a refresh time interval. In the present embodiment, the refresh time interval is three seconds. At step S202, the periodic service manager 90 triggers the LED drivers 70 to refresh the displays of the plural LEDs. At step S203, the check module 72 of the LED driver 70 obtains current operation statuses of the power supply and the RPS from the CPU 60. At step S204, the check module 72 obtains current operation statuses of the ports 41, 42, 43, 44, . . . 4n from the PHY module 80. At step 205, the refresh module 73 refreshes displays of the plural LEDs according to the statuses that are provided by the check module 72. At step S206, the periodic service manager 90 determines whether the refresh time interval has elapsed. If so, the procedure goes back to step 202. Otherwise, at step S207, the periodic service manager 90 determines whether the display mode of the port LEDs 31, 32, 33, 34, . . . 3n has been converted. If the display mode of the port LEDs 31, 32, 33, 34, . . . 3n has been converted, the procedure goes back to the step S201. Otherwise, the procedure is completed.

Figure 5:
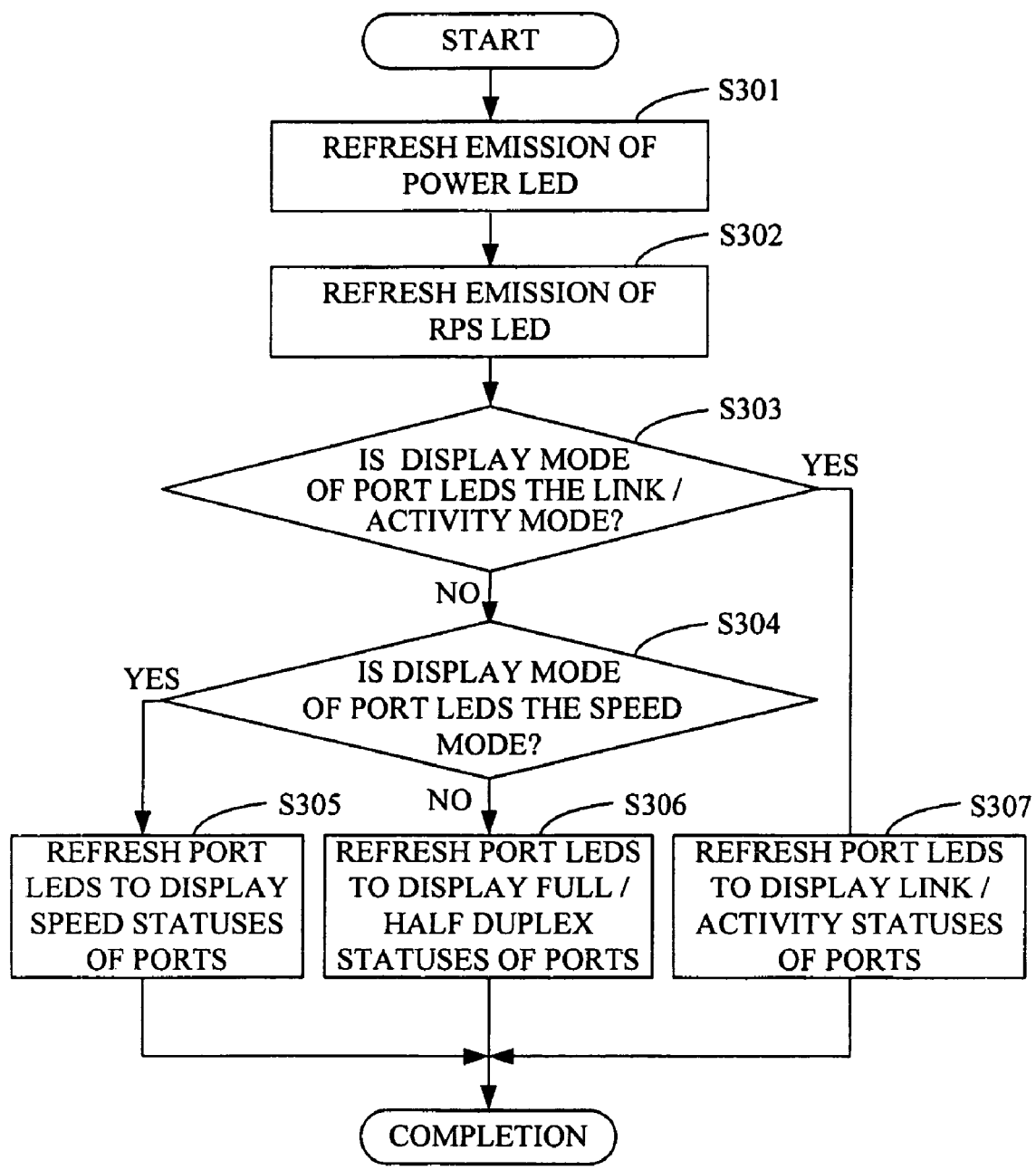
FIG. 5 is a flow chart of a method for refreshing displays of various port LEDs based on corresponding operation statuses of different ports.

FIG. 5 shows a method for refreshing displays of various port LEDs 31, 32, 33, 34, . . . 3n based on the corresponding working statuses of the different ports 41, 42, 43, 44, . . . 4n. At step S301, the refresh module 73 refreshes the display of the power LED 20. If the power supply is valid, the refresh module 73 refreshes the power LED 20 to display a green light. If the power supply is invalid, the refresh module 73 turns off the power LED 20. At step S302, the refresh module 73 refreshes the display of the RPS LED 21. If the power supply is invalid, and the RPS is connected to the switch and works normally, then the refresh module 73 refreshes the RPS LED 21 to display a green light. If the power supply is invalid, and the RPS is connected to the switch but works abnormally, then the refresh module 73 refreshes the RPS LED 21 to display an amber light. If the power supply is valid, or if the power supply is invalid and the RPS is not connected to the switch, then the refresh module 73 turns off the RPS LED 21.

At step 303, the refresh module 73 determines whether the display mode of the port LEDs 31, 32, 33, 34, . . . 3n is the link/activity mode 100 based on the displays of the mode LEDs 22, 23, 24. If so, the procedure goes to step S307 described below. Otherwise, at step S304, the refresh module 73 determines whether the display mode of the port LEDs 31, 32, 33, 34, . . . 3n is the speed mode 101. If so, the procedure goes to step S305 described below. Otherwise, the procedure goes to step S306 described below.

At step S305, the refresh module 73 refreshes the displays of the port LEDs 31, 32, 33, 34, . . . 3n respectively based on the speed statuses of the ports 41, 42, 43, 44, . . . 4n. For instance, as regards the port LED 31 and corresponding port 41, if data are transmitted through the port 41 at a speed of 10 Mbps, the refresh module 73 turns off the corresponding port LED 31. If data are transmitted through the port 41 at a speed of 100 Mbps, the refresh module 73 refreshes the port LED 31 to display a green light. If data are transmitted through the port 41 at a speed of 1000 Mbps, the refresh module 73 refreshes the port LED 31 to flash a green light.

At step S306, the refresh module 73 refreshes the display of each port LED 31, 32, 33, 34, . . . 3n based on the full/half duplex status of each port 41, 42, 43, 44, . . . 4n. For instance, as regards the port LED 31 and corresponding port 41, if data are transmitted through the port 41 in a half duplex mode, the refresh module 73 turns off the port LED 31. If data are transmitted through the port 41 in a full duplex mode, the refresh module 73 refreshes the port LED 31 to display a green light.

At step S307, the refresh module 73 refreshes the display of each port LED 31, 32, 33, 34, . . . 3n based on the link/activity status of each port 41, 42, 43, 44, . . . 4n. For instance, as regards the port LED 31 and corresponding port 41, if the port 41 is not connected to the switch, the refresh module 73 turns off the port LED 31. If the port 41 is connected to the switch, the refresh module 73 refreshes the port LED 31 to display a green light. If the port 41 is connected to the switch, but cannot send and receive data normally, then the refresh module 73 refreshes the port LED 31 to display an amber light. If the port 41 is connected to the switch, and can send and receive data normally, then the refresh module 73 refreshes the port LED 31 to flash a green light.

Figure 6:
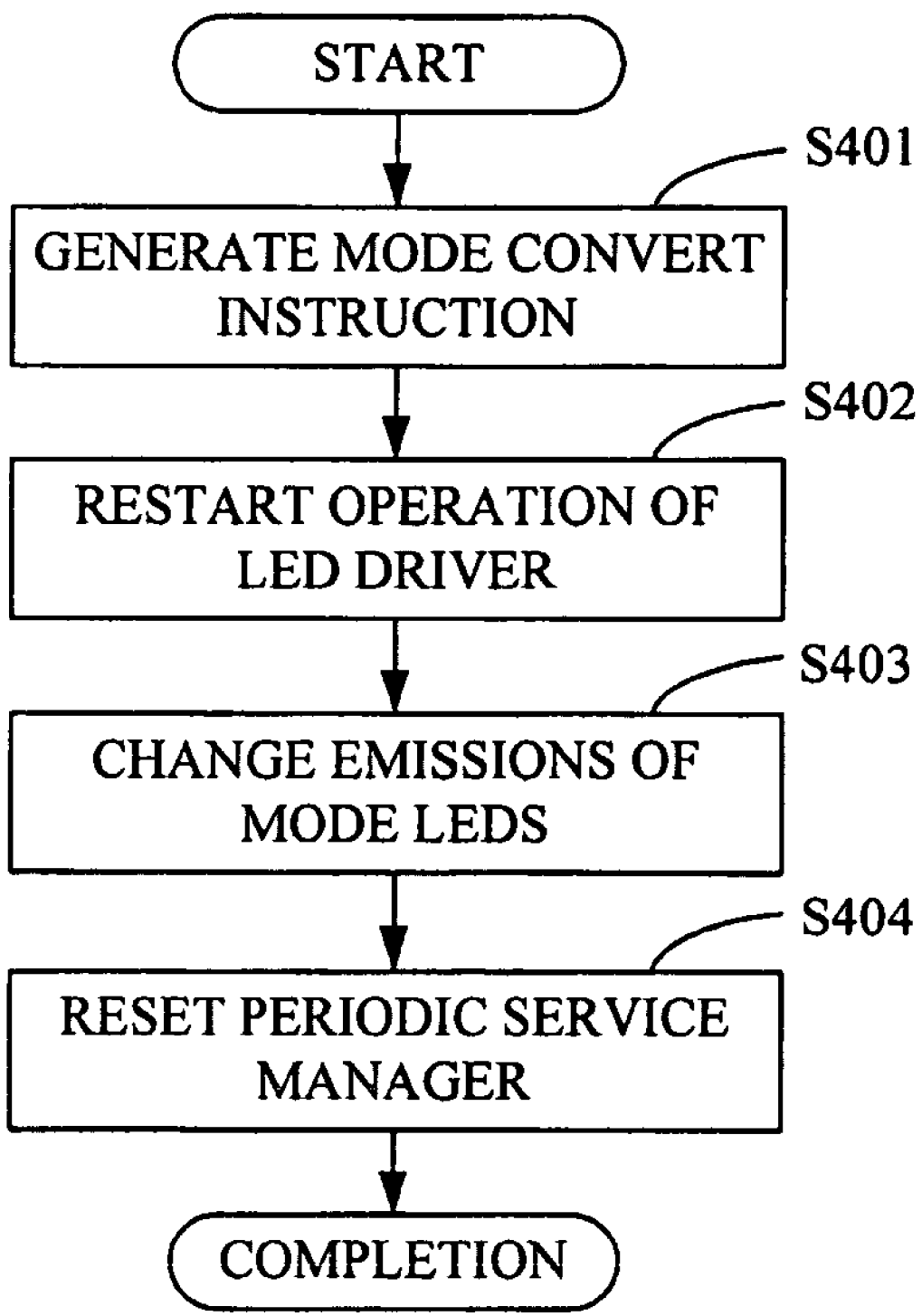
FIG. 6 is a flow chart of a method for converting the display modes of the port LEDs.

FIG. 6 shows a method for converting the display mode of the port LEDs 31, 32, 33, 34, . . . 3n. At step S401, when the administrator presses the mode convert button 25, an instruction for converting the display mode of the port LEDs 31, 32, 33, 34, . . . 3n is generated. At step S402, when the CPU 60 receives the instruction, the CPU 60 drives the interrupt module 71 to restart the LED driver 70. At step S403, the refresh module 73 changes the displays of the mode LEDs 22, 23, 24. At step S404, the interrupt module 71 resets the periodic service manager 90, and the periodic service manager 90 resets a refresh time interval and begins a next cycle.

While a preferred embodiment and a preferred method of the present invention have been described above, it should be understood that they have been presented by way of example only and not by way of limitation. Thus the breadth and scope of the present invention should not be limited by the above-described exemplary embodiment and method, but should be defined only in accordance with the following claims and their equivalents.

What is claimed is:

1. A system for diagnosing breakdowns of a switch, comprising:
a plurality of port light emitting diodes (LEDs) for displaying operation statuses of a plurality of ports;
a user interface for generating an instruction to convert display modes of the port LEDs;
a CPU (central processing unit) coupled to the user interface for dealing with the instruction and obtaining operation statuses of a power supply and a redundant power supply (RPS);
an LED driver coupled to the port LEDs for refreshing the displays of the port LEDs;
a physics (PHY) module coupled to the LED driver and used for obtaining the operation statuses of the ports; and
a periodic service manager coupled to the LED driver for triggering the LED driver to refresh the port LEDs periodically.

2. The system for diagnosing breakdowns of a switch in claim 1, further comprising a power LED coupled to the LED driver for displaying the operation status of the power supply.

3. The system for diagnosing breakdowns of a switch in claim 2, wherein the power LED is a bi-colored LED.

4. The system for diagnosing breakdowns of a switch in claim 2, further comprising an RPS LED coupled to the LED driver for displaying the operation status of the RPS.

5. The system for diagnosing breakdowns of a switch in claim 4, wherein the RPS LED is a bi-colored LED.

6. The system for diagnosing breakdowns of a switch in claim 4, further comprising a link/activity LED coupled to the LED driver.

7. The system for diagnosing breakdowns of a switch in claim 6, further comprising a speed LED coupled to the LED driver.

8. The system for diagnosing breakdowns of a switch in claim 7, further comprising a full/half duplex LED coupled to the LED driver.

9. The system for diagnosing breakdowns of a switch in claim 8, wherein the LED driver comprises an interrupt module for restarting the LED driver and resetting a refresh time interval of the periodic service manager when a display mode of the port LEDs is converted.

10. The system for diagnosing breakdowns of a switch in claim 9, wherein the LED driver further comprises a check module for obtaining the operation statuses of the power supply and the RPS from the CPU, and for obtaining the operation statuses of the ports from the PHY module.

11. The system for diagnosing breakdowns of a switch in claim 10, wherein the LED driver further comprises a refresh module coupled to the interrupt module and the check module for refreshing the displays of the power LED, the RPS LED and the port LEDs, and for refreshing the displays of the link/activity LED, the speed LED and the full/half duplex LED when the operation of the LED driver is restarted.

12. The system for diagnosing breakdowns of a switch in claim 1, wherein the display modes of the port LEDs comprise a link/activity mode, a speed mode, and a full/half duplex mode.

13. The system for diagnosing breakdowns of a switch in claim 1, wherein the user interface is a mode convert button.

14. The system for diagnosing breakdowns of a switch in claim 1, wherein a refresh time interval of the periodic service manager can be set selectively.

15. A method for diagnosing breakdowns of a switch, the method comprising the steps of:
(a) setting a refresh time interval;
(b) triggering a light emitting diode (LED) driver;
(c) obtaining operation statuses of a power supply and a redundant power supply (RPS);
(d) obtaining operation statuses of a plurality of ports;
(e) refreshing displays of a plurality of LEDs;
(f) determining whether a refresh time interval has elapsed, and if so, returning to step (b); otherwise,
(g) determining whether a display mode of port LEDs has been converted, and if so, returning to step (a).

16. The method for diagnosing breakdowns of a switch in claim 15, wherein step (d) comprises the steps of:
(d1) refreshing a display of a power LED;
(d2) refreshing a display of an RPS LED;
(d3) determining whether the display mode of the port LEDs is a link/activity mode; if so,
(d4) refreshing the port LEDs to display link/activity statuses of the ports;
(d5) determining whether the display mode of the port LEDs is a speed mode; if so,
(d6) refreshing the port LEDs to display speed statuses of the ports; and
(d7) refreshing the port LEDs to display full/half duplex statuses of the ports if the display mode of the port LEDs is not the speed mode.

17. The method for diagnosing breakdowns of a switch in claim 15, wherein step (g) comprises the steps of:
(g1) generating an instruction for converting the display mode of the port LEDs;
(g2) restarting the LED driver;
(g3) refreshing the displays of a link/activity LED, a speed LED, and a full/half duplex LED; and
(g4) resetting a refresh time interval of a periodic service manager.

18. A method for managing display of operation statues of a switch device having a plurality of connection ports, comprising the steps of:
expressing said operation status of each of said plurality of ports via one light emitting diode (LED);
expressing at least two preset display modes of said one LED by a corresponding mode light emitting diode (mode LED) respectively;
selecting one of said at least two preset display modes of said one LED;
expressively displaying said one of said at least two preset display modes by said corresponding mode LED;
retrieving said operation statuses of said each of said plurality of ports based on said one of said at least two preset display modes of said one LED;
expressively displayng said operation statuses of said each of said plurality of ports via said one LED.

19. The method in claim 18, further comprising the step of converting said one of said at least two display modes of said one LED to another of said at least two display modes of said one LED.

20. The method in claim 18, further comprising the step of periodically refreshing expressive display of said one LED according to periodical updates of said operation statuses of said each of said plurality of ports.

* * * * *